United States Patent [19]

Nagano

[11] Patent Number: 4,533,031

[45] Date of Patent: Aug. 6, 1985

[54] CLUTCH DISK HAVING ALTERNATINGLY CONNECTED SUBPLATES BETWEEN FRICTION WASHERS

[75] Inventor: Tamio Nagano, Hirakata, Japan

[73] Assignee: Kabushiki Kaisha Daikin Seisakusho, Osaka, Japan

[21] Appl. No.: 393,401

[22] Filed: Jun. 29, 1982

[30] Foreign Application Priority Data

Jun. 30, 1981 [JP] Japan ............................. 56-98241[U]

[51] Int. Cl.³ .......................... F16D 3/14; F16D 3/66; F16D 13/64
[52] U.S. Cl. ............................. 192/106.2; 192/70.17; 192/106.1; 464/68
[58] Field of Search ............... 192/106.2, 106.1, 70.16, 192/70.17; 464/46, 68, 96

[56] References Cited

U.S. PATENT DOCUMENTS

| | | | |
|---|---|---|---|
| 2,314,948 | 3/1943 | Nutt | 192/106.2 |
| 3,931,876 | 1/1976 | Beeskow et al. | 192/106.1 X |
| 4,352,586 | 10/1982 | Stanley | 192/106.2 |

FOREIGN PATENT DOCUMENTS

| | | | |
|---|---|---|---|
| 2751044 | 5/1978 | Fed. Rep. of Germany | 192/106.2 |
| 1413429 | 11/1975 | United Kingdom | 192/106.2 |
| 1428557 | 3/1976 | United Kingdom | 192/106.2 |
| 1441688 | 7/1976 | United Kingdom | 192/106.2 |

*Primary Examiner*—Rodney H. Bonck
*Attorney, Agent, or Firm*—Armstrong, Nikaido, Marmelstein & Kubovcik

[57] ABSTRACT

A clutch disk having plural friction washers arranged in between a flange of hub and a retaining plate, having subplates arranged in between the friction washers and between the friction washer and the retaining plate respectively, with each subplate engaged with either the retaining plate or the flange in alternating order from the flange side, and having a cone spring and a sliding member arranged in order from the retaining plate to the nearest subplate.

5 Claims, 2 Drawing Figures

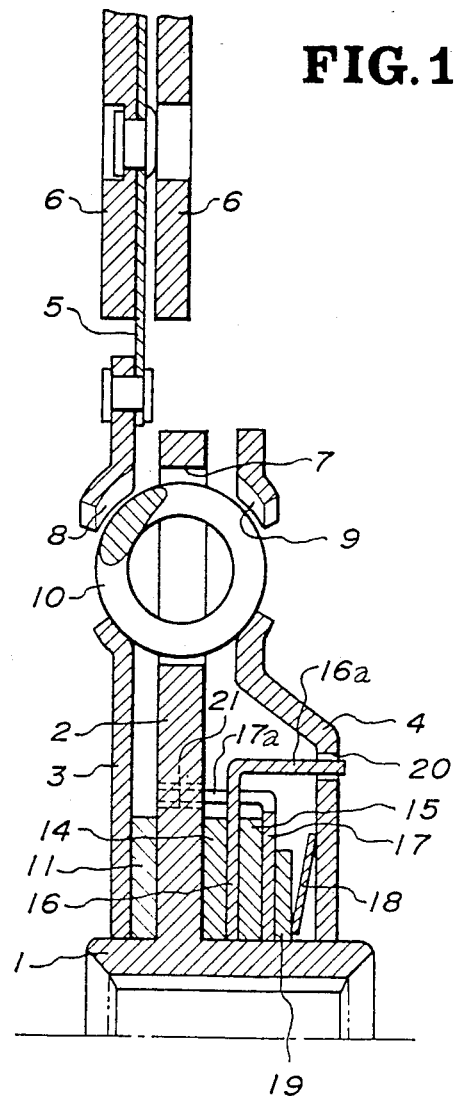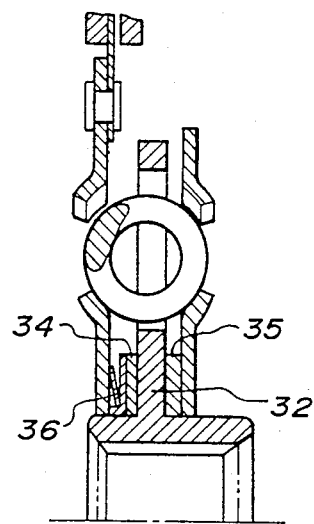
FIG. 1
FIG. 2
PRIOR ART

CLUTCH DISK HAVING ALTERNATINGLY CONNECTED SUBPLATES BETWEEN FRICTION WASHERS

FIELD OF THE INVENTION

This invention relates to a clutch disk.

SUMMARY OF THE INVENTION

An object of this invention is to improve the durability of a clutch disk. Another object of this invention it to provide a clutch disk having high-hysteresis torque.

In order to achieve the above objects in this invention, plural friction washers are arranged in between a flange of the hub and a side plate. Subplates are arranged in between the friction washers and between the friction washers and the side plate respective. In alternating sequence, each subplate is engaged with either the side plate or the flange in sequential order from the flange side. A cone spring and a sliding member having a low coefficient of friction are arranged in this order from the side plate between the subplate nearest to the side plate and the side plate.

BRIEF DESCRIPTION OF THE DRAWINGS

FIG. 1 is a vertical partial sectional view of a clutch disk according to this invention.

FIG. 2 is a vertical partial sectional view of a conventional clutch disk.

DETAILED DESCRIPTION OF THE INVENTION

In FIG. 1 which is the vertical sectional view of an upper half portion of the clutch disk in accordance with the present invention, 1 is an output side spline hub on which an outward annular flange 2 is integrally provided. Two side plates (for example, a clutch plate 3 and a retaining plate 4) are arranged on the opposite sides of the flange 2, and are connected by stud pins (not shown in the figure) so that they rotate together. The stud pins are arranged at plural positions around the side plates along the same circumference. Several cushioning plates 5 are fixed to an outer peripheral portion of the clutch plate 3, and input facings 6 are provided on both sides of the cushioning plates 5.

Plural window holes 7 are formed along the same circumference of the flange 2. Plural window holes 8, 9 corresponding to the window holes 7 are formed in both plates 3. A coil spring 10 is fitted in each set of the window holes 7, 8, 9, with the rotational torque of the plates 3, 4 being transmitted through the coil springs 10 to the flange 2 and the hub 1.

One friction washer 11 is arranged in between either of the plates 3 or 4 (for ex. the clutch plate 3) and the flange. First and second friction washers 14, 15, first and second subplates 16, 17, a cone spring 18, and sliding member 19 having a low coefficient of friction are arranged according to this invention in between the other retaining plate 4 and the flange 2.

Namely, in between the flange 2 and the retaining plate 4; the first friction washer 14, the first subplate 16, the second friction washer 15, the second subplate 17, the sliding plate 19, and the cone spring 18 are arranged in this order from the flange 2 side. The second subplate 17, the second friction washer 15, the first subplate 16, and the first friction washer 14 are pressed against the flange 2 through the sliding member 19 with a constant load by the elastic force of the cone spring 18. An engaging piece 16a extending toward the retaining plate 4 side is formed at an appropriate place on a circumference of the outer periphery of the first subplate 16. An engaging hole 20 corresponding to the above engaging piece 16a is formed on the retaining plate 4. In this manner, the first subplate 16 will rotate integrally with the retaining plate 4 by the engaging of the engaging piece 16a with the engaging hole 20. An engaging piece 17a extending toward the flange 2 side is formed on an outer peripheral portion of the second subplate 17 with some circumferential distance kept between the above-mentioned engaging piece 16a and the piece 17a, an engaging hole 21 is provided in the flange 2. The second subplate 17 will rotate integrally with the flange 2 by the engaging of the engaging piece 17a with the engaging hole 21 of the flange 2.

When the both plates 3 and 4 rotate with flange rotating in the same direction because of the coil spring 10, both plates 3 and 4 begin to twist in the rotational direction relatively to the flange 2 against the elastic force of the coil spring 10. The plates 3 and 4 will generate torsional vibration relatively to the flange 2. To cope with this torsional vibration, a hysteresis torque is generated in this invention by producing sliding friction at contacting areas between the first and second friction washers 14, 15 and the first and the second subplates 16, 17 respectively, at a contacting area between the first friction washer 14 and the flange 2, and at contacting areas between the friction washer 11 of the clutch plate 3 side and the flange 2 and the clutch plate 3.

In a conventional clutch disk as shown in FIG. 2, each one friction washer 34 and 35 is arranged on either side of a flange. The two friction washers 34 and 35 are made to produce hysteresis torque. In such a contional clutch disk having small number of friction surfaces for producing hysteresis torque, however, it has been necessary to increase spring load of a cone spring in order to produce high hysteresis torque. By increasing the spring load of the cone spring 36, contacting pressures of contacting surfaces between the friction washers 34, 35 and the flange 32 become large enough to cause larger wearing rate of the friction washers 34, 35 and the cone spring 36, and troubles such as a large reduction in durability may occur.

On the contrary, the following advantages are obtainable in accordance with the present invention:

(1) Plural friction washers such as the first and second friction washers 14, 15 are arranged in between flange 2 and the retaining plate (side plate 4). The first and the second subplates 16, 17 are so arranged as to contact with the friction washers 14, 15. The first subplate 16 is connected with the retaining plate 4 and the second subplate 17 is connected with the flange 2, thus increasing the number of frictional surfaces for generating the hysteresis torque by a large margin. Therefore, a high-hysteresis torque can be obtained without increasing the load of the cone spring 18, and noise etc. in engine idling can be removed securely.

(2) Wearing rates of the first and second friction washers 14, 15 are small since contacting pressures can not become large on each friction surface, that is, on both sides of the first and the second friction washers 14, 15. Further, the cone spring 18 presses the second subplate 17 etc. through the sliding member having low coefficient of friction, so that the cone spring 18 smoothly rotates together with the retaining plate 4 relatively to the second subplate 17 to minimize the wearing rate of the cone spring 18 itself. Consequently, the durability of the clutch disk can be improved by a large margin.

In the present invention, a washer having smooth surfaces or a needle thrust bearing may be introduced for the sliding member 19. The plural friction washers suach as the first and the second friction washers 14, 15 and the first and the second subplates 16, 17 are arranged in between the flange 2 and the retaining plate 4 in FIG. 1. However plural friction washers, subplates, and cone spring may be arranged in between the flange 2 and the clutch plate 3.

Two friction washers 14, 15 and two subplates 16, 17 are arranged respectively in between the flange 2 and the retaining plate 4 in the embodiment as shown in FIG. 1, however the number of the friction washers and the subplates may be increased further.

What is claimed is:

1. A clutch disk comprising:
a clutch plate,
cushioning plates fixed to an outer periphery of said clutch plate,
a retaining plate spaced apart from said clutch plate and connected thereto so as to rotate therewith,
a hub having a flange interposed between said clutch plate and said retaining plate,
spring means operatively interconnecting said flange with said clutch plate and said retaining plate for relative rotation therebetween,
a first friction washer interposed between said flange and said retaining plate,
a first subplate interposed between said first friction washer and said retaining plate,
a second friction washer interposed between said first subplate and said retaining plate,
a second subplate interposed between said second friction washer and said retaining plate,
a sliding member interposed between said second subplate and said retaining plate,
a cone spring interposed between said sliding member and said retaining plate biassing said sliding meber, said second subplate, said second friction washer, said first subplate and said first friction washer towards said flange,
means for connecting said first subplate to said retaining plate for rotation therewith,
means for connecting said second subplate to said flange for rotation therewith, and
a third friction washer interposed between said flange and said clutch plate.

2. A clutch disk as set forth in claim 1, wherein said sliding member is a washer having smooth surfaces.

3. A clutch disk as set forth in claim 1, wherein said retaining plate has an engaging hole therein and said means for connecting said first subplate to said retaining plate comprises an engaging piece axially extending from an outer periphery of said first subplate engaging with said engaging hole.

4. A clutch disk as set forth in claim 1 wherein said flange has an engaging hole therein and said means for connecting said second subplate to said flange comprises an engaging piece axially extending from an outer periphery of said second subplate engaging said engaging hole.

5. A clutch disk as set forth in claim 1, wherein said retaining plate has a first engaging hole therein; said flange has a second engaging hole therein; said means for connecting said first subplate to said retaining plate comprises a first engaging piece axially extending from an outer periphery of said first subplate engaging said first engaging hole; and said means for connecting said second subplate to said flange comprises a second engaging piece axially extending from an outer periphery of said second subplate engaging said second engaging hole.

* * * * *